United States Patent
Golovashchenko et al.

(10) Patent No.: US 7,197,970 B2
(45) Date of Patent: Apr. 3, 2007

(54) APPARATUS FOR TRIMMING METAL

(75) Inventors: Sergey Golovashchenko, Beverly Hills, MI (US); Michael Blodgett, Holland, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 431 days.

(21) Appl. No.: 10/710,712

(22) Filed: Jul. 29, 2004

(65) Prior Publication Data

US 2005/0022640 A1    Feb. 3, 2005

Related U.S. Application Data

(63) Continuation-in-part of application No. 09/927,281, filed on Aug. 10, 2001.

(51) Int. Cl.
*B26D 1/04*    (2006.01)

(52) U.S. Cl. .......................................... 83/167; 83/694

(58) Field of Classification Search ................ 83/694, 83/693, 686, 869, 167
See application file for complete search history.

(56) References Cited

U.S. PATENT DOCUMENTS

| | | | |
|---|---|---|---|
| 928,256 A | 7/1909 | Grissom | |
| 3,167,985 A | 2/1965 | Madsen | |
| 3,234,774 A * | 2/1966 | Margedant | 72/294 |
| 3,842,699 A | 10/1974 | Zyl | |
| 4,569,263 A | 2/1986 | Kravets | |
| 4,660,401 A | 4/1987 | Kohama et al. | |
| 4,679,473 A | 7/1987 | Hirata et al. | |
| 5,237,901 A | 8/1993 | Warga, III | |
| 5,373,767 A * | 12/1994 | Weisser | 83/682 |
| 5,458,717 A * | 10/1995 | Kurita | 156/253 |
| 5,820,999 A | 10/1998 | Li et al. | |
| 5,974,922 A | 11/1999 | Camp et al. | |
| 6,041,639 A * | 3/2000 | Pacher et al. | 72/294 |
| 6,370,931 B2 | 4/2002 | Bennett | |
| 6,431,037 B1 * | 8/2002 | Dai et al. | 83/13 |
| 6,672,193 B2 * | 1/2004 | Annoura et al. | 83/694 |

FOREIGN PATENT DOCUMENTS

CH    477 252    8/1969

* cited by examiner

*Primary Examiner*—Kenneth E. Peterson
(74) *Attorney, Agent, or Firm*—Raymond L. Coppiellie; Artz & Artz, P.C.

(57) ABSTRACT

An apparatus for trimming scrap from an aluminum sheet metal blank is provided. The apparatus includes a clamping base comprising a clamping base engagement surface positioned between a clamping base upper surface and a clamping base bottom surface. The clamping base engagement has a clamping base vertically orientated portion and a clamping base angled portion. A steady blade is mounted to the clamping base. The steady blade and the clamping base form a contiguous angled engagement surface. The steady blade engagement surface forms a steady blade trimming edge. An elastic scrap support and an upper clamping element are included. A moving blade includes a moving blade trimming edge formed by the intersection of the moving blade blade-side surface and the moving blade engagement surface. The moving blade engagement surface distributing strain on the aluminum blank as the moving blade trimming edge separates the scrap element from the aluminum blank.

18 Claims, 2 Drawing Sheets

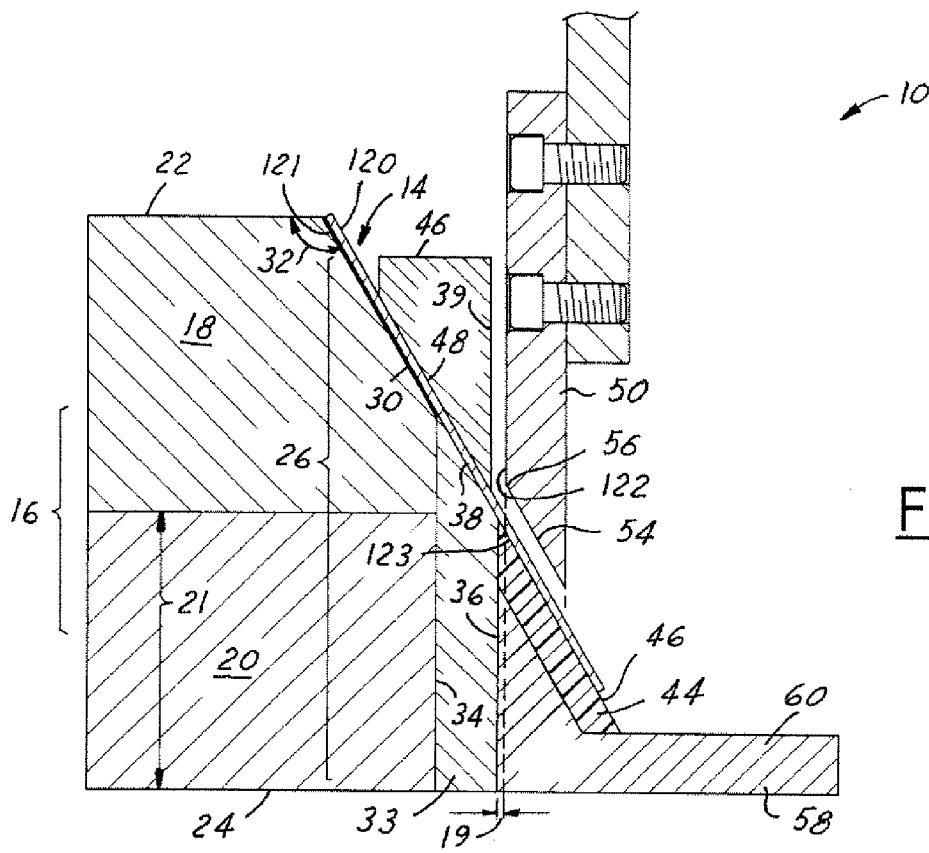
FIG. 1
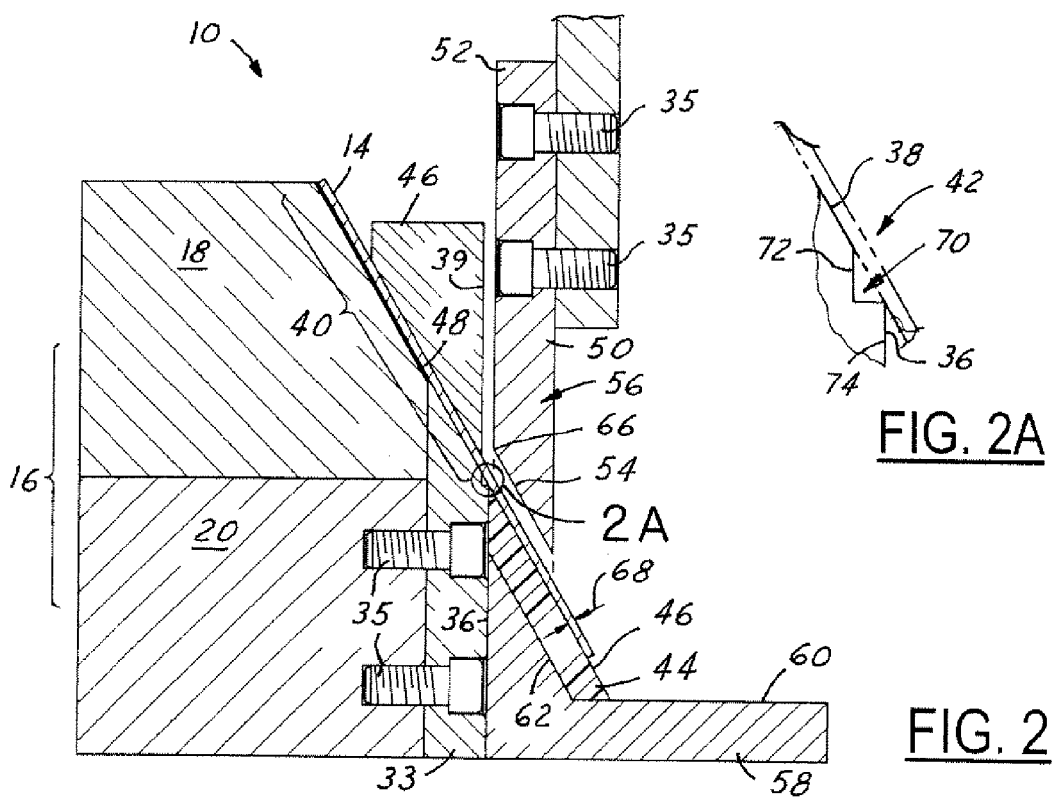
FIG. 2A
FIG. 2

APPARATUS FOR TRIMMING METAL

CROSS REFERENCE TO RELATED APPLICATIONS

This is a continuation-in-part of U.S. patent application Ser. No. 09/927,281 filed on Aug. 10, 2001.

BACKGROUND OF INVENTION

The present invention relates generally to an apparatus for trimming metal and more particularly to an apparatus for trimming metal that reduces defects.

Modern product design and manufacturing often utilizes a wide variety of materials. Where once low carbon steel predominated, a variety of new materials such as aluminum alloys are now being utilized. These new materials often are capable of reducing weight, increasing strength and improving product efficiency. Although such alternative materials may provide a variety of benefits in product manufacturing and design, these same materials may present difficulties when subjected to manufacturing processes originally designed for low carbon steel.

One such manufacturing area where difficulties may arise is in trimming operations. Alternative materials such as aluminum alloys can demonstrate different technological behavior due to differences in mechanical and surface properties and mass density when subjected to trimming operations. These difficulties may give rise to defects arising directly from the trimming process or arising from later operations due to effects caused by the trimming process.

One defect known to arise directly from the trimming process is the generation slivers. The generation of slivers, and similar problem finishes, is highly undesirable as such slivers may get attached to the blank surface and distributed to the dies following the trimming operation. The accumulation of slivers on both these dies and the blank surfaces can result in an unacceptable surface finish when the blank is subjected to press operations. The press operations can cause the slivers located on either the dies or the blanks to be forced into the blank surface.

Known systems for dealing with such slivers commonly focus on the removal of the slivers from the dies and the blanks rather than prevention of sliver generation. The removal of slivers from the dies and the blanks can be time-consuming and expensive. Often the cleaning of dies requires the interruption of automated stamping processes, which is highly undesirable. Furthermore, close visual inspection of a part surface finish is often required and additional metal work may be required to repair indentations caused by the slivers. These processes add to the cost and time of product manufacture and may lead to an increase in the number of parts that must be scrapped if repair is not feasible.

Another approach to the elimination slivers, has been to attempt to increase the accuracy of the alignment of the upper and lower trimming steels. One such standard, that attempts to reduce the problem, requires the gap between the shearing edges to be 10% of the material thickness or less. This standard, however, can translate into gaps of less than 0.1 mm for some sheet metals. Other approaches have further limited the gap to even smaller percentages of material thickness and thereby further decrease the gap. Unfortunately, the tolerances required by such standards often exceed the capabilities of many trim dies and can still result in the production of slivers. This may result in time consuming and expensive procedures that may still fail to eliminate the production of slivers.

A second defect that may arise directly in the trimming operation is the production of burrs. Burrs are known to decrease the quality and accuracy of stamped parts and are the sources of potential splits in following operations. Again, current standards attempt to limit the production of burrs through accurate alignment of the upper and lower trimming steels. These standards attempt to minimize the gap between the shearing edges to 10% of the material thickness. Other methods suggest even smaller reduction in gap such as 0–5% of the material thickness. Again, such tolerances may be beyond the capabilities of many trim dies.

In addition to those defects arising directly from the trimming operations, defects can arise in later operations such as hemming and flanging operations. These later arising defects often can be traced back to results from the trimming operation. Irregular trim surfaces can result in splits when the trimmed blank is later subjected to hemming or flanging. The production of these post trim defects can add to additional repair and may lead to an increase in the number of parts that must be scrapped if repair is not feasible.

Instead of attempting to repair defects after their production or reduce defects by impractical procedures, it would be more efficient and cost effective to improve the trimming process. A reduction in burr, sliver, and split production would decrease costs, reduce manufacturing time, improve surface finish and reduce scrap. It would, therefore, be desirable to have an apparatus for trimming that reduced the production of defects during the trimming process.

SUMMARY OF INVENTION

It is, therefore, an object of the present invention to provide an apparatus for trimming metal that reduces the generation of defects during operation.

In accordance with the object of the present invention, an apparatus for trimming scrap from an aluminum sheet metal blank is provided. The apparatus includes a clamping base comprising a clamping base upper surface, a clamping base bottom surface, and a clamping base engagement surface. The clamping base engagement surface is positioned between the clamping base upper surface and the clamping base bottom surface. The clamping base engagement surface comprises a clamping base vertically orientated portion perpendicular to the clamping base upper surface, and a clamping base angled portion intersecting said clamping base upper surface at an obtuse intersection angle. The apparatus further includes a steady blade mounted to the clamping base. The steady blade includes a steady blade mounting surface coincident with the clamping base vertically orientated portion, a vertically orientated steady blade blade-side surface, and a steady blade engagement surface angled to be substantially coplanar with the clamping base angled portion such that the steady blade and the clamping base form a contiguous angled engagement surface. The steady blade engagement surface intersects the vertically orientated steady blade blade-side surface to form a steady blade trimming edge. The apparatus includes an elastic scrap support comprising a support upper surface parallel and contiguous with the contiguous angled engagement surface. The apparatus includes an upper clamping element comprising an upper clamping engagement surface parallel with the contiguous angled engagement surface. The upper clamping engagement surface is positioned to engage an aluminum blank positioned between the upper clamping element and the contiguous angled engagement surface. The upper clamping element is positioned such that the upper clamping engagement surface is positioned partly over the clamping base angled portion and partially over the steady blade engagement surface. The apparatus includes a moving blade movable past the steady blade for trimming said aluminum blank. The moving blade comprises a moving blade blade-side surface parallel to the steady blade blade-side surface, a moving blade engagement surface generally parallel with the contiguous angled engagement surface, and a moving blade trimming edge formed by the intersection of the moving blade blade-side surface and the moving blade engagement surface. The moving blade engagement surface distributing strain on the aluminum blank as the moving blade trimming edge separates the scrap element from the aluminum blank.

Other objects and features of the present invention will become apparent when viewed in light of the detailed description of the preferred embodiment when taken in conjunction with the attached drawings and appended claims.

BRIEF DESCRIPTION OF DRAWINGS

FIG. 1 is an illustration of an embodiment of an apparatus for trimming metal in accordance with the present invention;

FIG. 2 is an illustration of an alternate embodiment of an embodiment of an apparatus for trimming metal in accordance with the present invention;

DETAILED DESCRIPTION

Figure 3:
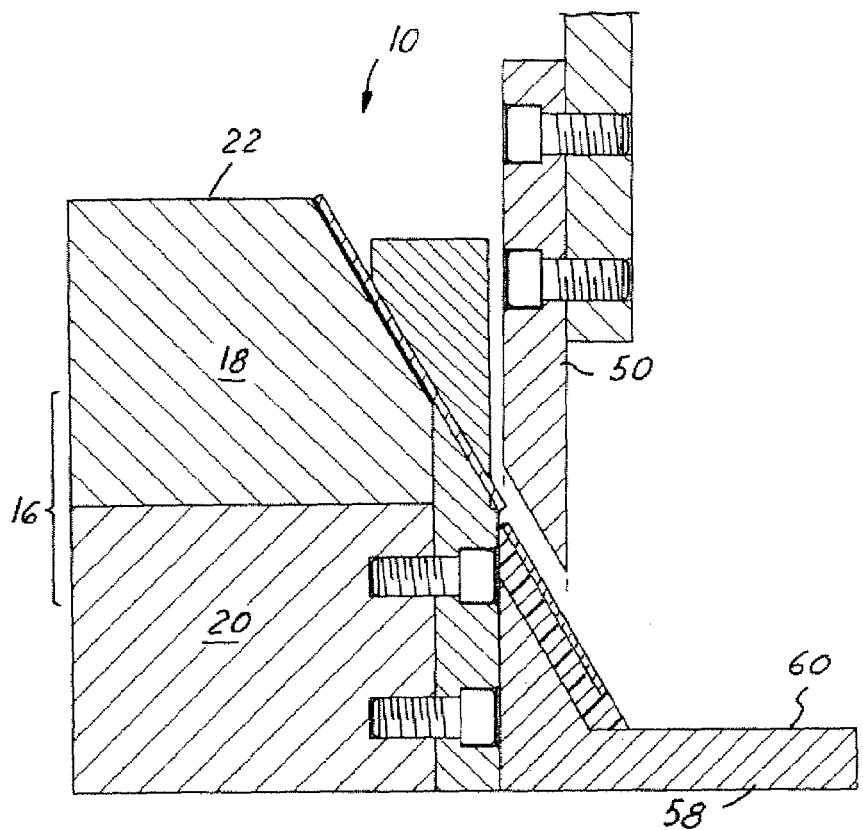
FIG. 3 is an illustration of the apparatus for trimming metal shown in FIG. 1 in a post-operation stage.
Figure 4:
FIG. 4 is an illustration of an alternate embodiment of the apparatus for trimming metal shown in FIG. 1, the illustration showing a curvilinear cutting edge.

Referring now to FIG. 1, which is an illustration of an embodiment of an apparatus 10 for trimming scrap 12 from a sheet metal blank 14 in accordance with the present invention. The apparatus for trimming scrap 10 includes a clamping base 16 and upper clamping element 46 for securing the aluminum sheet metal blank 14 to be trimmed against a steady blade 33. Although the basic mode of clamping and trimming may be known, the present invention provides benefits over known structures and methods. When known systems are used to trim alternate materials such as aluminum alloys, however, an unacceptable generation of material slivers and other defects may occur. In order to minimize slivers, and other defects, prior art processes attempted to minimize the gap 19 between the steady blade 33 and the moving blade 50. However, even upon minimization of the gap 19, also known as trim clearance, the production of slivers may still occur. In addition, as the gap 19 is reduced, often the time and expense of the trimming operation may increase.

One reason for the continued production of slivers in the prior art systems bending of the blank 14 during the trimming operation. This bending creates additional tensile strains near the blank upper surface 120 of the blank 14 and compressive strains around the blank lower surface 121. Decreasing the gap 19 can decrease the bending moment but it cannot be eliminated even for zero gap because forces are not concentrated on exactly the leading edges 122, 123. This results in the blank 14 cracking first on the blank upper surface 120. Contact pressure between the moving blade 50 and the blank 14 creates hydrostatic pressure that increases the blanks ductility and prevents its failure where they are in contact. As a result, the cracking starts at a point in the blank 14 not in contact with the moving blade 50. In the prior art, this creates a small tongue between the cracking and the sharp edge of the moving blade (not shown) that is bent and broken off creating slivers.

To eliminate this phenomena, the present invention has developed an improved apparatus for trimming the scrap 12 from the aluminum sheet metal blank 14. The apparatus includes a clamping base 16 comprised of an upper clamping base 18 and a lower clamping base 20. Although a single piece clamping base 16 may be utilized, a two piece clamping base 16 provides adaptability such that the lower clamping base height 21 can be adjustable through substitution of different lower clamping bases 20 to accommodate a wide variety of scrap widths 23 (see FIG. 3). The clamping base 16 includes a clamping base upper surface 22, a clamping base bottom surface 24, and a clamping base engagement surface 26. The clamping base engagement surface is 26 is comprised of a clamping base vertically orientated portion 28 preferably perpendicular to the clamping base upper surface 22, and a clamping base angled portion 30 intersecting the clamping base upper surface 22 and an obtuse intersection angle 32. This allows the aluminum blank 14 to be retained at an angle relative to the trimming blades 34, 50.

The present invention further includes a steady blade 33 mounting to the clamping base 16. The steady blade 33 is preferably removably mounted using attachment elements 35 (see FIG. 2) such that it can be easily replaced and serviced during operation. The steady blade 33 comprises a steady blade mounting surface 34 coincident with the clamping base vertically orientated portion 28 to facilitate easy secure mounting. The steady blade 33 further comprises a vertically orientated steady blade blade-side surface 36 and a steady blade engagement surface 38. The steady blade engagement surface 38 is preferably angled to be substantially coplanar with the clamping base angled portion 30 to form a contiguous angled engagement surface 40. The steady blade engagement surface 38 intersects the vertically orientated steady blade blade-side surface 36 to form a steady blade trimming edge 42.

The present invention further includes an elastic scrap support 44 mounted in communication with the steady blade 33. The elastic scrap support 44 includes a support surface 46 parallel and contiguous with the contiguous angled engagement surface 40. The elastic scrap support 44 in combination with the contiguous angled engagement surface 40 provides unequalled support of the blank 14 during the trimming process and thereby provide greater control of the scrap 12 and allow for a greater reduction in sliver production. A stop surface 58 is preferably utilized in conjunction with the elastic scrap support 44 to further provide control. One embodiment contemplates a stop surface 58 having a first stop surface 60 generally parallel to the clamping base upper surface 22 and a second stop surface 62 generally parallel to the contiguous angled engagement surface 40. The second stop surface 62 is preferably non-contiguous with the contiguous angled engagement surface 40 to allow the elastic scrap support 44, when mounted on the second stop surface 62, to be positioned in a contiguous relationship with the contiguous angled engagement surface 40. This form of support for the elastic scrap support 44 allows the scrap 12 to be loaded by the moving blade 50 while still retaining original orientation relative to the aluminum sheet metal blank 14. This drastically reduces the aforementioned bending and sliver producing movements.

The aluminum sheet metal blank 14 is clamped to the contiguous angled engagement surface 40 utilizing an upper clamping element 46 having an upper clamping surface 48 parallel with the contiguous angled engagement surface 40. The upper clamping engagement surface 48 is positioned to engage the aluminum blank 14 positioned between it and the contiguous angled engagement surface 40. The upper clamping engagement surface 48 is preferably positioned such that the upper clamping engagement surface is positioned partly over the clamping base angled portion 30 and partly over the steady blade engagement surface 38. This is again utilized to reduce the bending of blank 14 or scrap 12 and thereby reduce resultant sliver production. The upper clamping element blade-side surface 39 is preferably non-contiguous with the moving blade blade-side surface 52.

The present invention utilizes the moving blade 50 to separate the scrap 12 from the blank 14. The moving blade is also preferably removable for maintenance and replacement using attachment elements 35. The removal of scrap 12 is accomplished by way of moving the moving blade 50 past the steady blade 33 until the scrap 12 is separated. The unique relationship between the moving blade 50, the steady blade 33, and the contiguous angled engagement surface 40 allows further reductions in undesirably bending moments. The moving blade 50 includes a moving blade blade-side surface 52 parallel to the steady blade blade-side surface 36, a moving blade engagement surface 54 generally parallel with the contiguous angled engagement surface 40, and a moving blade trimming edge 56. The moving blade trimming edge is formed by the intersection of the moving blade blade-side surface 52 and the moving blade engagement surface 54. The moving blade engagements surface 54 engages the blank 14 with a surface area parallel to the blank at the same time as the blade trimming edge 56 is generating a trimming load. This acts to distribute strain on the aluminum sheet metal blank 14 as it is being trimmed and thereby reduces slivers. In addition, it converts a vertical loading into a normal load on the aluminum blank 14. Additionally, the moving blade engagement surface 54 insures a movement of the scrap 12 parallel to the blank's 14 original orientation. This works in conjunction with the other mechanical aspects of the present invention to reduce strain and sliver production.

A radius 66 can be formed into the moving blade trimming edge 56 of the moving blade 50. By forming a radius 66 on the moving blade trimming edge 56 of the moving blade 50, the strain experienced by the blank 14 is distributed in a wider area which when used in conjunction with the other sliver reduction features of the present invention provides unique benefits. Although the cracking still develops away from the moving blade 50, the tongue has a bigger cross-section and is strong enough to stay on the scrap 12 when the scrap 12 is being separated from the blank 14 (see FIG. 3). This results in a reduction in the production of slivers. It is preferable that the radius 66 be several times less than the blank thickness 68. In one embodiment, for illustrative purposes only, the blank thickness 68 is 0.93 mm and the radius 66 is 0.12 mm. Although a blank thickness 68 and radius 66 have been described, it should be understood that a vast array of radii can be used in conjunction with differing blank thickness and blank materials may be utilized.

In alternate embodiments, the present invention can impact an even wider variety of defects. In addition to slivers, trimming defects such as burrs and other surface faults that may result in post-trimming defects such as splits may also be reduced. Most materials have a higher ductility in the compressive stress state than in tensile. Bending the scrap 12 (forces the cracking on the upper surface 20 to dominate. Cracking starting on the blank upper surface 120 from the moving blade 50 generates burrs proportional to the gap 19 that remain on the part side of the trimmed surface. It is preferable, however, to have the cracking start from the steady blade 33 so that any burrs remain on the scrap 12. The unique design of the elastic scrap support 44 alone or in combination with the stop surface 58 has been found to promote cracking of the blank 14 beginning from the steady blade 33. This allows for a wider range of gaps 19. In addition, it reduces the horizontal forces, due to the parallel movement of the scrap 12. Finally, the present embodiment preserves the blanks 14 ductility along the trim line as compared to the prior art and thereby further enhances the blank's 14 usefulness.

The present invention may be modified in a variety of ways to alter or improve performance. One embodiment contemplates the notch 70, forming in the steady blade trimming edge 42. The notch 70 is preferably comprised of a vertical notch surface 72 intersecting the steady blade engagement surface 38, and a horizontal notch surface 74 intersecting the steady blade vertical surface 36. The use of the notch 70 can further insure that cracking of the blank 14 originates on the steady blade 33 side of the blank 14 which further assures any burrs are retained on the scrap 12. This can further allow a greater range of gaps 19 to be utilized without developing slivers or burrs on the blank 14. It should be understood that the angle of the blank 14 (i.e. 180°-obtuse angle 32) in FIG. 1 without the notch 70 is preferably 15°–45°. When using the notch 70 as in FIG. 2, the angle of the blank can be increased to larger angles such as 60°–80°. This further improves sliver reduction.

Figure 5:
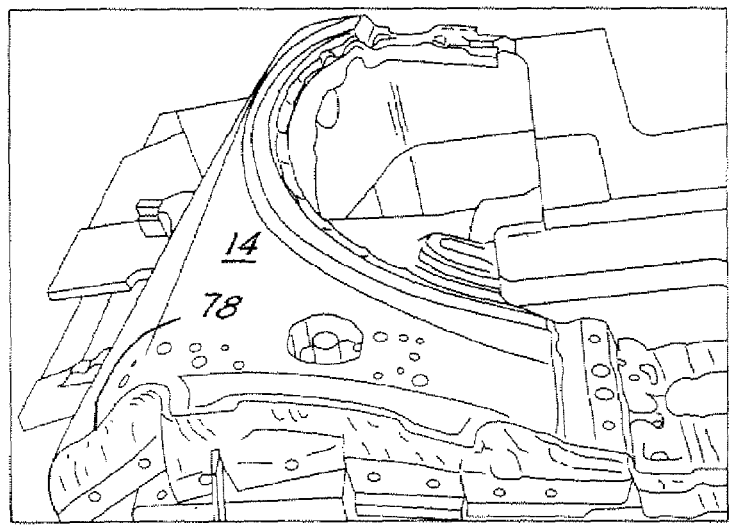
FIG. 5 is an illustration of a aluminum sheet metal blank formed using the embodiment illustrated in FIG. 4.

Finally, a most unique configuration of the present invention contemplates the use of a moving blade 50 with a curvilinear cutting edge 76 (see FIG. 5). The curvilinear cutting edge 76 allows complex trimming edges 78 to be generated during a single trimming action (see FIG. 5). Normal trimming operations with the requirements of minimal gap 19 often make complex shaped trimming unrealistic due to jamming. The recited structure of the present invention, however, allows for a greater gap 19 tolerance and therefore provides an opportunity to generate complex trimming edges 78 on structures.

While particular embodiments of the invention have been shown and described, numerous variations and alternative embodiments will occur to those skilled in the art. Accordingly, it is intended that the invention be limited only in terms of the appended claims.

The invention claimed is:
1. An apparatus for trimming scrap from an aluminum sheet metal blank comprising:
   a clamping base comprising:
   a clamping base upper surface;
   a clamping base bottom surface; and
   a clamping base engagement surface positioned between said clamping base upper surface and said clamping base bottom surface, said clamping base engagement surface comprising:
   a clamping base vertically orientated portion perpendicular to said clamping base upper surface; and
   a clamping base angled portion intersecting said clamping base upper surface at an obtuse intersection angle;
   a steady blade mounted to said clamping base, said steady blade comprising:

a steady blade mounting surface coincident with said clamping base vertically orientated portion;

a vertically orientated steady blade blade-side surface; and a steady blade engagement surface angled to be substantially coplanar with said clamping base angled portion such that said steady blade and said clamping base form a contiguous angled engagement surface, said steady blade engagement surface intersecting said vertically orientated steady blade blade-side surface to form a steady blade trimming edge;

an elastic scrap support comprising a support upper surface parallel and contiguous with said contiguous angled engagement surface;

an upper clamping element comprising an upper clamping engagement surface parallel with said contiguous angled engagement surface, said upper clamping engagement surface positioned to engage an aluminum blank positioned between said upper clamping element and said contiguous angled engagement surface, said upper clamping element positioned such that said upper clamping engagement surface is positioned partly over said clamping base angled portion and partially over said steady blade engagement surface;

a moving blade movable past said steady blade for trimming said aluminum blank, said moving blade comprising:

a moving blade blade-side surface parallel to said steady blade blade-side surface, a moving blade engagement surface generally parallel with the contiguous angled engagement surface, and a moving blade trimming edge formed by the intersection of said moving blade blade-side surface and said moving blade engagement surface, said moving blade engagement surface distributing strain on said aluminum blank as said moving blade trimming edge separates a scrap element from said aluminum blank.

2. An apparatus for trimming scrap from an aluminum sheet metal blank as described in claim 1, further comprising:

a stop surface having a first stop surface generally parallel to said clamping base upper surface and a second stop surface generally parallel to said contiguous angled engagement surface, said second stop surface noncontiguous with said contiguous angled engagement surface, said elastic scrap support element mounted on said second stop surface.

3. An apparatus for trimming scrap from an aluminum sheet metal blank as described in claim 1, wherein an upper clamping element blade-side surface is noncontiguous with said moving blade blade-side surface.

4. An apparatus for trimming scrap from an aluminum sheet metal blank as described in claim 1, wherein said moving blade separates said scrap from said aluminum blank by moving said scrap vertically while said elastic scrap support and said moving blade engagement surface act in concert to maintain the orientation of said scrap parallel to said contiguous angled engagement surface.

5. An apparatus for trimming scrap from an aluminum sheet metal blank as described in claim 1, wherein said moving blade engagement surface exerts a normal force onto said scrap.

6. An apparatus for trimming scrap from an aluminum sheet metal blank as described in claim 1, wherein said moving blade and said steady blade are removable.

7. An apparatus for trimming scrap from an aluminum sheet metal blank as described in claim 1, wherein said clamping base comprises:

an upper clamping base including said clamping base angled portion and a portion of said clamping base vertically orientated portion; and a lower clamping base mounted to said upper clamping base, said lower clamping base including a lower clamping base height, said lower clamping base replaceable such that said lower clamping base height accommodates a variety of scrap widths.

8. An apparatus for trimming scrap from an aluminum sheet metal blank as described in claim 1, wherein said moving blade trimming edge comprises a curvilinear cutting edge.

9. An apparatus for trimming scrap from an aluminum sheet metal blank as described in claim 1, further comprising:

a notch formed in said steady blade trimming edge.

10. An apparatus for trimming scrap from an aluminum sheet metal blank as described in claim 9, wherein said notch comprises:

a vertical notch surface intersecting said steady blade engagement surface; and a horizontal notch surface intersecting said steady blade vertical surface.

11. An apparatus for trimming scrap from an aluminum sheet metal blank as described in claim 1, further comprising:

a radius formed on said moving blade trimming edge.

12. An apparatus for trimming scrap from an aluminum sheet metal blank comprising:

a clamping base comprising:

a clamping base engagement surface comprising:

a clamping base vertically orientated portion; and a clamping base angled portion intersecting said clamping base vertically orientated portion at an obtuse intersection angle;

a steady blade mounted to said clamping base, said steady blade comprising:

a steady blade mounting surface coincident with said clamping base vertically orientated portion;

a vertically orientated steady blade blade-side surface; and a steady blade engagement surface angled to be substantially coplanar with said clamping base angled portion such that said steady blade and said clamping base angled portion form a contiguous angled engagement surface, said steady blade engagement surface intersecting said vertically orientated steady blade blade-side surface to form a steady blade trimming edge;

an elastic scrap support comprising a support upper surface contiguous with said contiguous angled engagement surface;

an upper clamping element comprising an upper clamping engagement surface parallel with said contiguous angled engagement surface, said upper clamping engagement surface positioned to engage an aluminum blank positioned between said upper clamping element and said contiguous angled engagement surface;

a moving blade movable past said steady blade for trimming said aluminum blank, said moving blade comprising:

a moving blade blade-side surface parallel to said steady blade blade-side surface, a moving blade engagement surface generally parallel with the contiguous angled engagement surface, and a moving blade trimming edge formed by the intersection of said moving blade blade-side surface and said moving blade engagement surface, said moving blade engagement surface maintaining said scrap parallel to said contiguous angled engagement surface as said moving blade trimming edge separates said scrap from said aluminum blank.

13. An apparatus for trimming scrap from an aluminum sheet metal blank as described in claim 12, further comprising:
a stop surface having a first stop upper surface and a second stop upper surface, said second stop surface generally parallel to said contiguous angled engagement surface, said second stop surface non-contiguous with said contiguous angled engagement surface, said elastic scrap support element mounted on said second stop upper surface.

14. An apparatus for trimming scrap from an aluminum sheet metal blank as described in claim 12, wherein said moving blade separates said scrap from said aluminum blank by moving said scrap vertically while said elastic scrap support and said moving blade engagement surface act in concert to maintain the orientation of said scrap parallel to said contiguous angled engagement surface.

15. An apparatus for trimming scrap from an aluminum sheet metal blank as described in claim 12, wherein said moving blade trimming edge comprises a curvilinear cutting edge.

16. An apparatus for trimming scrap from an aluminum sheet metal blank as described in claim 12, further comprising:
a notch formed in said steady blade trimming edge.

17. An apparatus for trimming scrap from an aluminum sheet metal blank as described in claim 16, wherein said notch comprises:
a vertical notch surface intersecting said steady blade engagement surface; and
a horizontal notch surface intersecting said steady blade vertical surface.

18. An apparatus for trimming scrap from an aluminum sheet metal blank as described in claim 12, further comprising:
a radius formed on said moving blade trimming edge.

* * * * *